(12) United States Patent
Lang et al.

(10) Patent No.: US 6,332,746 B1
(45) Date of Patent: *Dec. 25, 2001

(54) LOCKING MECHANISM FOR ROLL-OFF HOIST

(75) Inventors: Allen M. Lang, Mansfield, TX (US); Gordon C. Shaw, Columbus, MS (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,715

(22) Filed: May 26, 2000

Related U.S. Application Data

(63) Continuation of application No. 09/081,998, filed on May 21, 1998, now Pat. No. 6,068,440.

(51) Int. Cl.[7] .................................................. B60P 1/04
(52) U.S. Cl. ........................... 414/494; 414/491; 414/500
(58) Field of Search ................................... 414/477–480, 414/491, 494, 500, 559, 679, 812; 410/68–70, 80

(56) References Cited

U.S. PATENT DOCUMENTS

| | | | | |
|---|---|---|---|---|
| 3,399,795 | * | 9/1968 | Clucker et al. | 414/500 |
| 3,467,268 | * | 9/1969 | Corompt | 414/500 X |
| 3,857,504 | * | 12/1974 | Bausenbach et al. | 414/500 |
| 3,957,166 | * | 5/1976 | Durham | 414/500 X |
| 4,109,810 | * | 8/1978 | Jones | 414/494 X |
| 4,165,007 | * | 8/1979 | Brown | 414/494 |
| 4,992,014 | * | 2/1991 | Bock | 410/68 X |
| 5,088,875 | * | 2/1992 | Galbreath et al. | 414/478 |
| 5,839,864 | * | 11/1998 | Reynard | 410/69 |
| 5,848,869 | * | 12/1998 | Slocum et al. | 414/480 X |
| 6,053,692 | * | 4/2000 | Mason et al. | 414/484 X |

* cited by examiner

Primary Examiner—James W. Keenan
(74) Attorney, Agent, or Firm—Liniak, Berenato, Longacre & White, LLC

(57) ABSTRACT

A locking mechanism is provided for a roll-off container hoist. The locking mechanism secures a roll-off container to the roll-off container hoist when the hoist is in a transport orientation and releases the roll-off container when the hoist is moved from the transport orientation toward a hoisting orientation. Also provided is a container hoist which includes such a locking mechanism, as well as a vehicle which carries a locking-mechanism-equipped container hoist. A method of using the container hoist likewise is provided. Preferably, the locking mechanism requires no springs or other resilient actuators and instead is freely actuated by gravity in one direction and by engagement with a preferably rigid actuating surface in an opposite direction. The locking mechanism includes a movable plate and a guide for the movable plate. The movable plate is freely movable through the guide, from a locking position to an unlocking position and vice versa. The mounting of the movable plate is so that when it is placed in the locking position, the movable plate projects out from the guide so as to restrain the container. By contrast, when the movable plate is placed in the unlocking position, the movable plate is withdrawn into the guide away from the container to thereby release the container. Preferably, mounting of the movable plate is performed so that the movable plate automatically moves into the locking position when the hoist is in the substantially horizontal transport orientation and automatically moves into the unlocking position when the container hoist is taken out of the transport orientation toward the inclined hoisting orientation. The movable plate preferably is pivotally mounted in the guide.

20 Claims, 5 Drawing Sheets

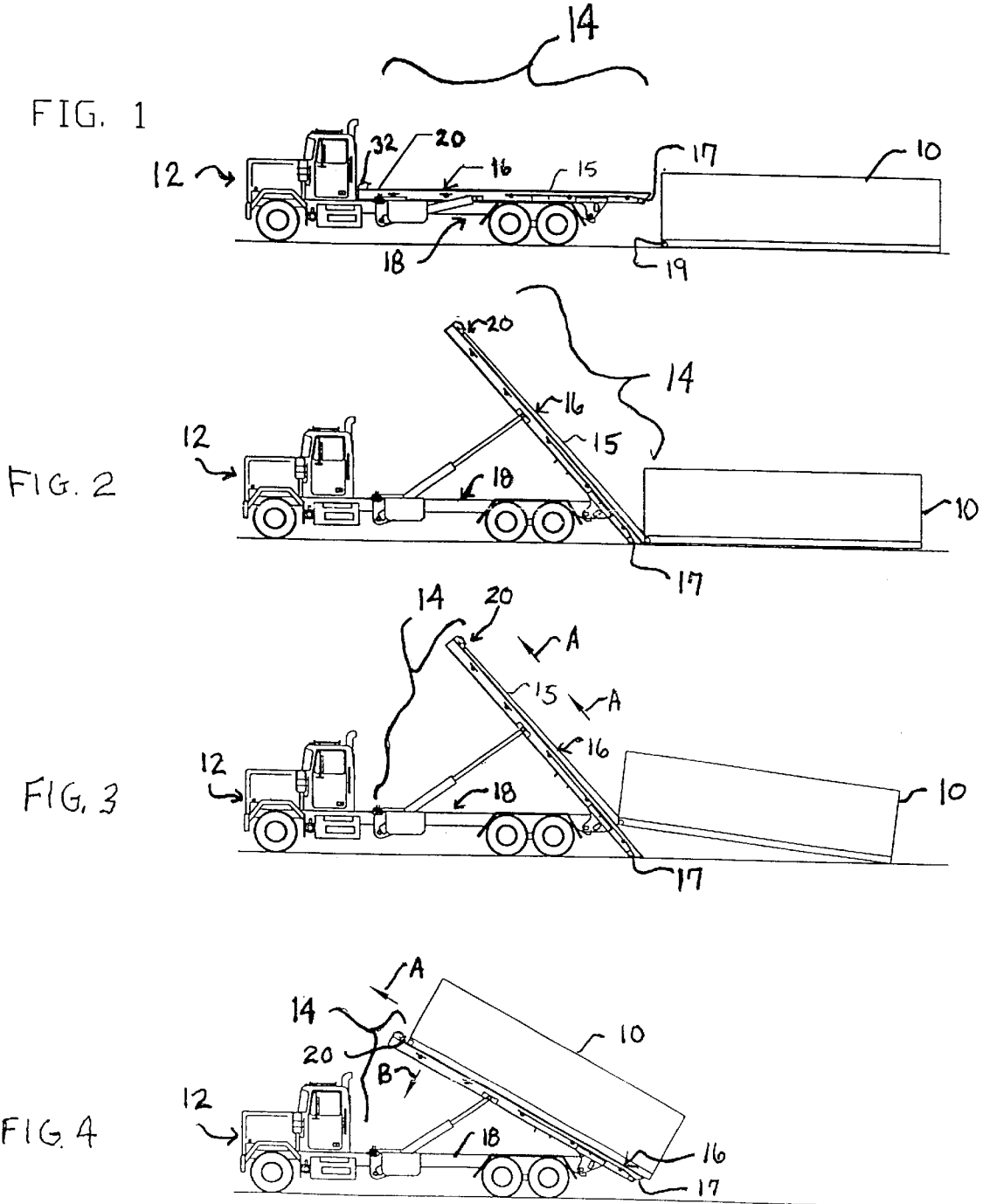

LOCKING MECHANISM FOR ROLL-OFF HOIST

CROSS-REFERENCE TO RELATED APPLICATIONS

This application is a continuation of U.S. patent application Ser. No. 09/081,998 filed on May 21, 1998 (now U.S. Pat. No. 6,068,440).

BACKGROUND OF THE INVENTION

The present invention relates to a locking mechanism for a roll-off container hoist, and more particularly, to a locking mechanism for securing a roll-off container to the roll-off container hoist when the hoist is in a transport orientation and for releasing the roll-off container when the hoist is moved from the transport orientation toward a hoisting orientation. The present invention also relates to a container hoist which includes such a locking mechanism, as well as a vehicle which carries a locking-mechanism-equipped container hoist. The present invention also provides a method of using the container hoist.

Vehicle-mounted container hoists are commonly used to load, unload and transport roll-off containers. Examples of such roll-off containers include conventional trash compactors and receptacles associated therewith. Such roll-off containers can weigh thousands of pounds. It is therefore extremely important that such containers remain secured to the vehicle and/or hoist during transport. Failure to keep the container secured during transport can pose a significant danger to the driver of the vehicle, as well as the public.

During transport, the roll-off containers are subject to significant jarring forces generated by changes in the vehicle's acceleration, abrupt steering, rapid braking, pot holes, and otherwise uneven road surfaces. There is consequently a need for a reliable and strong locking arrangement which positively secures the container to the vehicle and/or hoist.

Although simple manual locking arrangements can be used to secure the roll-off container to the vehicle, such manual arrangements disadvantageously depend upon the operator's memory. If the operator forgets to lock the container to the vehicle or to the hoist, a significant safety hazard will exist. Manual locking arrangements therefore provide less than optimum results.

In order to avoid the risk of having the operator forget to engage the locking mechanism, complex automatic locking arrangements can be used. Such locking mechanisms might include sensors which detect some aspect of the hoisting operation or the presence of the container, and a lock driver responsive to the sensor to actuate a locking device. Alternatively, such arrangements may include a spring or other resilient member which urges a locking member to engage the container and which is selectively disengaged to release the container using complex disengagement means. The resulting arrangements, however, can be relatively expensive to implement. In addition, they may be susceptible to failure, especially when exposed to wet and/or dusty environments, as well as road debris.

With regard to the spring or resilient member-based arrangements, it is possible for the spring or resilient member to become damaged by the weight of the containers.

Moreover, the containers are sometimes transported in an empty condition, but are also transported when full. There are consequently significant variations in the weight of the containers. This makes it extremely difficult to obtain a spring arrangement that reliably locks and disengages at the appropriate times.

There is consequently a need in the relevant art for a reliable, simple and inexpensive locking mechanism for use in a roll-off container hoist.

SUMMARY OF THE INVENTION

A primary object of the present invention is to overcome the disadvantages of the foregoing arrangements by providing a reliable, yet relatively simple and inexpensive locking mechanism for selectively restraining a roll-off container on a hoist bed.

Another object of the invention is to provide a hoist which includes the locking mechanism of the present invention.

Yet another object of the present invention is to provide a vehicle equipped with a hoist of the present invention.

Still another object of the present invention is to provide a method for hoisting a roll-off container using a hoist according to the present invention.

The foregoing and other objects are achieved using a locking mechanism which advantageously requires no springs or other resilient actuators and which is freely actuated by gravity in one direction and by engagement with a preferably rigid actuating surface in an opposite direction.

The locking mechanism according to the present invention is arranged so as to selectively restrain the roll-off container to the hoist bed. The locking mechanism includes a movable plate and a guide for the movable plate. The movable plate is freely movable through the guide, from a locking position to an unlocking position and vice versa. The mounting of the movable plate is such that when it is placed in the locking position, the movable plate projects out from the guide so as to restrain the container. By contrast, when the movable plate is placed in the unlocking position, the movable plate is withdrawn into the guide away from the container to thereby release the container.

Preferably, mounting of the movable plate is performed such that the movable plate automatically moves into the locking position when the hoist is in the substantially horizontal transport orientation and automatically moves into the unlocking position when the container hoist is taken out of the transport orientation toward the inclined hoisting orientation.

The automatic movement of the movable plate into the unlocking position preferably is achieved by arranging the movable plate so that, whenever the hoist is taken out of the transport orientation, gravity pulls the movable plate into the unlocking position. Automatic movement toward the locking position, by contrast, is achieved by providing the movable plate with a bearing surface and by providing an appropriately arranged actuating surface. When the hoist is brought into the transport orientation, the bearing surface is engaged by the actuating surface, and this engagement serves to urge the movable plate against gravity, into the locking position.

Preferably, the movable plate is pivotally mounted in the guide so as to pivot between the locking and unlocking positions.

The present invention also provides a container hoist for loading, unloading and transporting a roll-off container. The container hoist includes a frame, a hoist bed pivotally mounted to the frame; and at least one locking mechanism for selectively restraining a roll-off container to the hoist bed. The locking mechanism includes a guide formed in the hoist bed and a movable plate mounted in the guide. The movable plate of the locking mechanism is freely movable through the guide, between a locking position and an unlocking position. In particular, the movable plate is mounted so that when the movable plate is in the locking position, the movable plate projects out from the guide so as to restrain the roll-off container. When the movable plate is in the unlocking position, by contrast, the movable plate is withdrawn into the guide away from the roll-off container to thereby release the roll-off container.

The present invention also provides a vehicle for loading, unloading and transporting a roll-off container. The vehicle includes a vehicle chassis and a container hoist. The container hoist includes a frame mounted to the vehicle chassis, a hoist bed pivotally mounted to the frame, and at least one locking mechanism for selectively restraining a roll-off container to the hoist bed. The locking mechanism includes a guide formed in the hoist bed and a movable plate mounted in the guide. The movable plate of the locking mechanism is freely movable through the guide, between a locking position and an unlocking position. In particular, the movable plate is mounted so that when the movable plate is in the locking position, the movable plate projects out from the guide so as to restrain the roll-off container. When the movable plate is in the unlocking position, by contrast, the movable plate is withdrawn into the guide away from the roll-off container to thereby release the roll-off container.

The present invention also provides a vehicle-mounted roll-off hoist for loading, transporting and unloading roll-off containers. The vehicle-mounted roll-off hoist includes a frame having a forward portion and a rearward portion, and a hoist bed hingedly connected to the rearward portion of the frame, to pivot between a substantially horizontal transport position and an inclined hoisting position. The hoist bed has oppositely disposed first and second end portions. A first freely pivotal plate is mounted to and carried by the hoist bed at the first end portion. The pivotal plate is arranged and shaped so as to engage the frame and be urged by the frame upwardly so as to extend beyond a top surface of the hoist bed when the hoist bed is in the substantially horizontal transport position, and so as to pivot at least partially below a bottom surface of the hoist bed when the hoist bed is in the inclined hoisting position. The vehicle-mounted roll-off hoist further includes at least one actuator which is selectively actuated to move the hoist bed between the substantially horizontal transport position and the inclined hoist position.

The present invention also includes a method for hoisting and securing a roll-off container using a vehicle-mounted roll-off container hoist. The method includes an initial step of pivoting a hoist bed from a substantially horizontal transport position wherein at least one movable plate mounted in the hoist bed is urged upwardly by a vehicle frame and thereby projects at least partially above a top surface of the hoist bed, to an inclined hoisting position wherein the movable plate is taken away from the vehicle frame and drops freely at least to the top surface of the hoist bed under the influence of gravity. The roll-off container then is hoisted upwardly along the top surface of the hoist bed until a predetermined portion of the roll-off container reaches the movable plate. The hoist bed then is pivoted from the inclined hoisting position to the substantially horizontal transport position so that the movable plate engages the vehicle frame and is urged at least partially above the top surface of the hoist bed by the vehicle frame, to engage and restrain the roll-off container.

The above and other objects and advantages will become more readily apparent when reference is made to the following description taken in conjunction with the accompanying drawings.

BRIEF DESCRIPTION OF THE DRAWINGS

FIG. 1 is an elevation view of a roll-off container prior to hoisting and a vehicle-mounted roll-off container hoist in a transport orientation, according to a preferred embodiment of the present invention.

FIG. 2 is an elevation view of the roll-off container and the container hoist of FIG. 1 when the container hoist is in an inclined hoisting orientation.

FIG. 3 is an elevation view of the roll-off container and the container hoist of FIGS. 1 and 2 in an early stage of hoisting.

FIG. 4 is an elevation view of the roll-off container and the container hoist of FIGS. 1–3 in a later stage of hoisting.

DETAILED DESCRIPTION OF THE INVENTION

Figure 5:
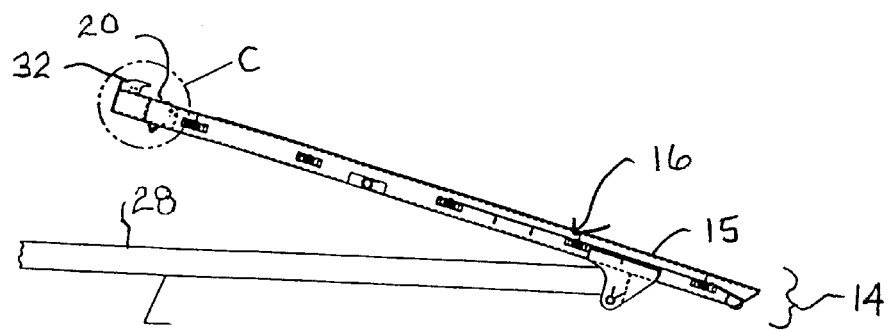
FIG. 5 is a side view of the roll-off container hoist in an inclined hoisting orientation.

As shown in FIGS. 1–4, hoisting of a roll-off container 10 involves a series of steps. Initially, as shown in FIG. 1, the roll-off container 10 is approached by a vehicle 12 equipped with a roll-off container hoist 14. The hoist 14 has a hoist bed 16 which is substantially horizontal during transport.

As shown in FIG. 2, after the hoist 14 is brought sufficiently close to the container 10, the hoist 14 is pivoted to an inclined orientation. This pivoting continues while the hoist 14 is brought closer to the container 10, until a rear beveled edge 17 of the hoist bed 16 engages a bottom front edge 19 of the container 10.

Once engaged, the container 10 is hoisted along a top surface 15 of the hoist bed 16, as shown in FIG. 3. The direction of travel for the container is represented by arrows A.

Figure 6:
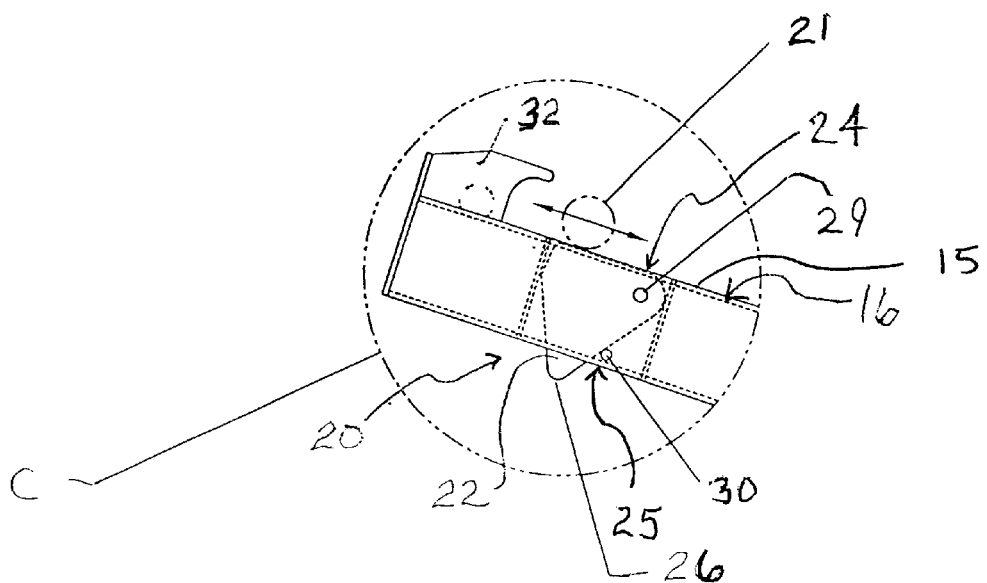
FIG. 6 is an enlarged view of a locking mechanism on the roll-off container hoist of FIG. 5.

As illustrated in FIG. 4, the angle between the hoist bed 16 and the hoist frame 18 may be progressively reduced while the hoisting continues. The arrow B represents the pivoting direction of the hoist bed 16 near the end of a hoisting operation. Eventually, the container 10 reaches a front portion of the hoist bed 16. At the front portion, a locking mechanism 20 according to the present invention may be provided, as illustrated in FIG. 5. FIG. 6 is an enlarged view of the locking mechanism 20, taken from within the circle C of FIG. 5. In FIG. 6, the only portion of the container 10 which is illustrated is a guide roller 21.

The locking mechanism 20 is arranged so as to selectively restrain the container to the hoist bed 16. Preferably, as illustrated in FIG. 6, the locking mechanism 20 includes a movable plate 22 and a guide 24 for the movable plate 22. The guide 24 is defined by the walls of a slot 25 in the hoist bed 16. The movable plate 22 is freely movable through the guide 24, from a locking position to an unlocking position and vice versa. The mounting of the movable plate 22 is such that when it is placed in the locking position, the movable plate 22 projects out from the guide 24 so as to restrain the container 10. By contrast, when the movable plate 22 is placed in the unlocking position, the movable plate 22 is withdrawn into the guide 24 away from the roll-off container 10 to thereby release the roll-off container 10.

Preferably, the mounting of the movable plate 22 is performed such that the movable plate 22 automatically moves into the locking position when the container hoist 14 is in the substantially horizontal transport orientation and automatically moves into the unlocking position when the container hoist 14 is taken out of the transport orientation toward the inclined hoisting orientation.

The automatic movement of the movable plate 22 into the unlocking position preferably is achieved by arranging the movable plate 22 so that, whenever the hoist 14 is taken out of the transport orientation, gravity pulls the movable plate 22 into the unlocking position. Automatic movement toward the locking position, by contrast, is achieved by providing the movable plate 22 with a bearing surface 26 and by providing an appropriately arranged actuating surface 28, preferably defined by the frame 18. When the hoist 14 is brought into the transport orientation, the bearing surface 26 is engaged by the actuating surface 28, and this engagement serves to urge the movable plate 22 against gravity, into the locking position.

Notably, the illustrated arrangement achieves the automatic locking and unlocking operations without the need for springs or other resilient actuators. The movable plate 22, in this regard, is freely movable or pivotable. This represents a significant advantage over other arrangements which require springs or other resilient actuators.

As illustrated in FIG. 6, the movable plate 22 is shaped so that the bearing surface 26 protects out from the bottom of the guide 24 when the movable plate 22 is in the unlocking position. Preferably, the shape is triangular, although other shapes would suffice. This, in turn, facilitates engagement of the bearing surface 26 by the actuating surface 28. It is understood, however, that the invention is not limited to such an arrangement. To the contrary, numerous alternative arrangements can be used, for example, where the actuating surface 28 projects into the guide 24 to engage the bearing surface 26.

Preferably, the movable plate 22 is pivotally mounted in the guide 24 so as to pivot between the locking and unlocking positions. The pivotal mounting is achieved using a pivot pin 29 which passes through the movable plate 22. The pivot pin 29 is supported at its ends by the guide 24. It is understood, however, that such pivotal mounting is not required. Similar results can be achieved using other arrangements, such as arrangements wherein the movable plate 22 slides linearly through the guide 24.

A stop member 30 preferably limits movement of the movable plate 22 and thereby prevents over-pivoting of the exemplary movable plate 22. The illustrated stop member 30 comprises a pin which extends between the inside walls of the guide 24. The location of the stop member 30 preferably is selected so that pivoting of the movable plate 22 stops when the top of the movable plate 22 reaches a position flush with or immediately below the top surface 15 of the hoist bed 16 (e.g., the position illustrated in FIG. 6) and the bearing surface 28 projects out from the bottom surface of the hoist bed 16.

The hoist 14 further includes at least one container stop 32. The container stop 32 cooperates with the movable plate 22 to secure the container 10 on the hoist bed 16. Each container stop 32 preferably is hook-shaped and precludes movement of the container 10 beyond a predetermined position on the hoist bed 16. In particular, the container stop 32 precludes movement of the container 10 in a first direction (forward) while the movable plate 22 precludes movement in an opposite direction (rearward) when it is placed in the locking position.

Figure 7:
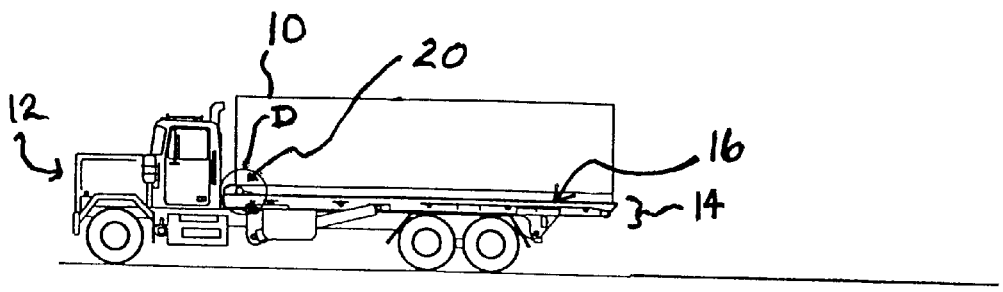
FIG. 7 is an elevation view of the roll-off container and vehicle-mounted roll-off container hoist after hoisting has been completed and the container hoist has been placed in a substantially horizontal transport orientation.
Figure 8:
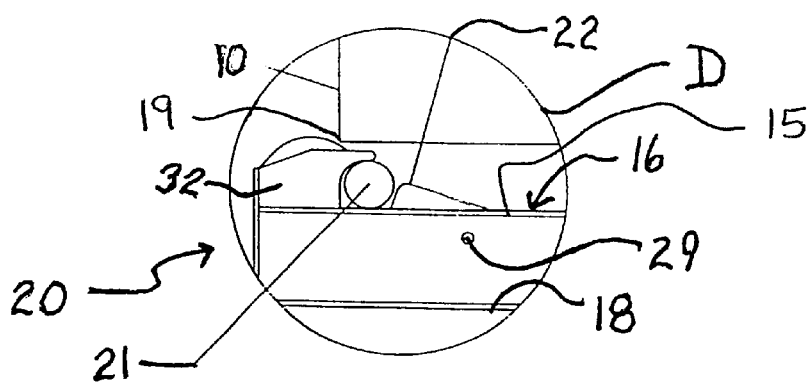
FIG. 8 is an enlarged view of the locking mechanism when the container hoist has been placed in the substantially horizontal transport orientation.

As illustrated in FIGS. 7 and 8, the substantially horizontal transport orientation of the hoist bed 16 is achieved at the end of a hoisting operation. In the transport orientation, the hoist bed 14 comes into contact with the frame 18. This causes the movable plate 22 to project out above the top surface 15 of the hoist bed 16 and therefore places the movable plate 22 in the locking position. FIG. 8 is an enlarged view of the locking mechanism 20, taken within the circle D of FIG. 7. In the locking position of FIG. 8, the guide roller 21 of the container 10 is trapped between the container stop 32 and the movable plate 22. The container 10 therefore is prevented from rolling across the hoist bed 16.

Figure 9:
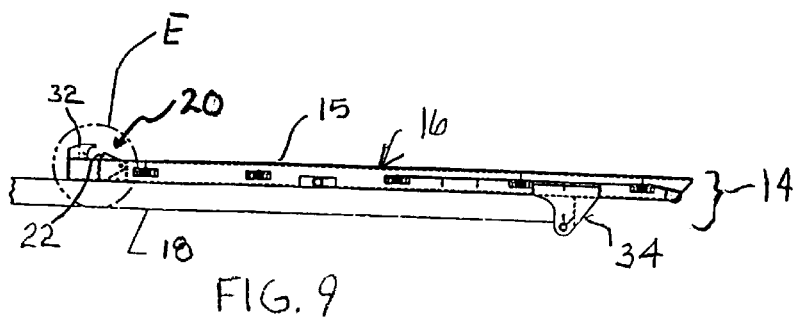
FIG. 9 is a side view of the container hoist when placed in the substantially horizontal transport orientation without a roll-off container.

FIG. 9 also shows the hoist bed 14 in the substantially horizontal transport position. In FIG. 9, the hinged connection 34 between the hoist bed 16 and the frame 18 is shown. This hinged connection 34 permits pivoting of the hoist bed 16 with respect to the frame 18 in a well-known manner.

Figure 10:
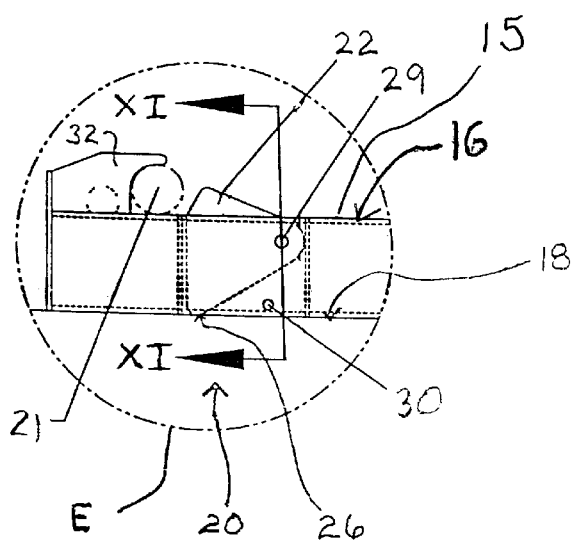
FIG. 10 is an enlarged view of the locking mechanism without the roll-off container.
Figure 11:
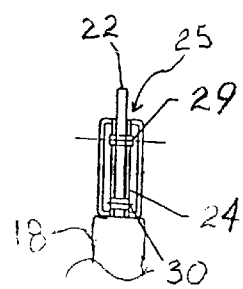
FIG. 11 is a cross-section of one rail of the container hoist, taken along line XI—XI in FIG. 10.

FIG. 10 is an enlarged view of the locking mechanism 20, taken within the circle E of FIG. 9. FIG. 11 is a cross section across line XI—XI of FIG. 10. FIGS. 10 and 11 show how the bearing surface 26 of the movable plate 22 engages the actuating surface 28 of the frame 18 and how this engagement displaces the movable plate 22 upwardly with respect to the hoist bed 16 to achieve the locking position.

Figure 12:
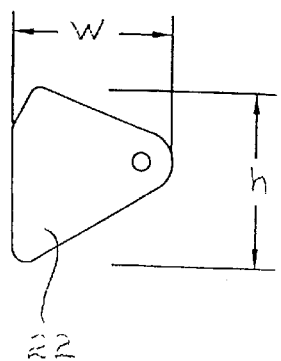
FIG. 12 is a side view of a movable plate in the locking mechanism.

FIG. 12 shows a preferred shape of the movable plate 22. The movable plate 22 preferably has a height (h) of about 12¾ inches and a width (w) of about 11⅝ inches. The movable plate 22 has a preferred thickness of about one inch and is made using a durable material, such as steel.

Figure 13:
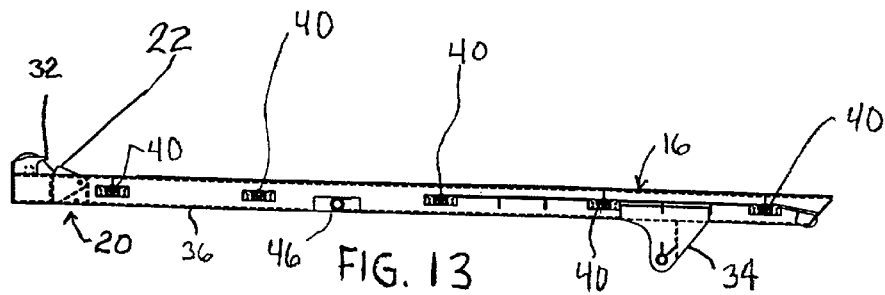
FIG. 13 is a side view of a hoist bed of the container hoist.
Figure 14:
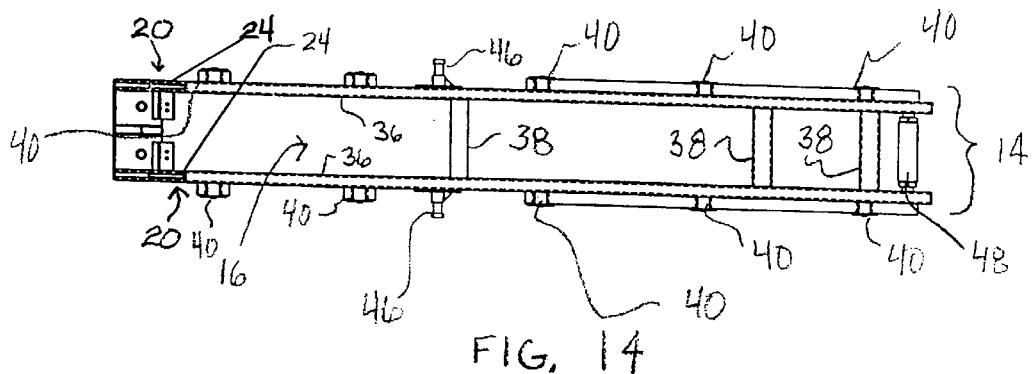
FIG. 14 is a plan view of the hoist bed which is illustrated in FIG. 13.
Figure 15:
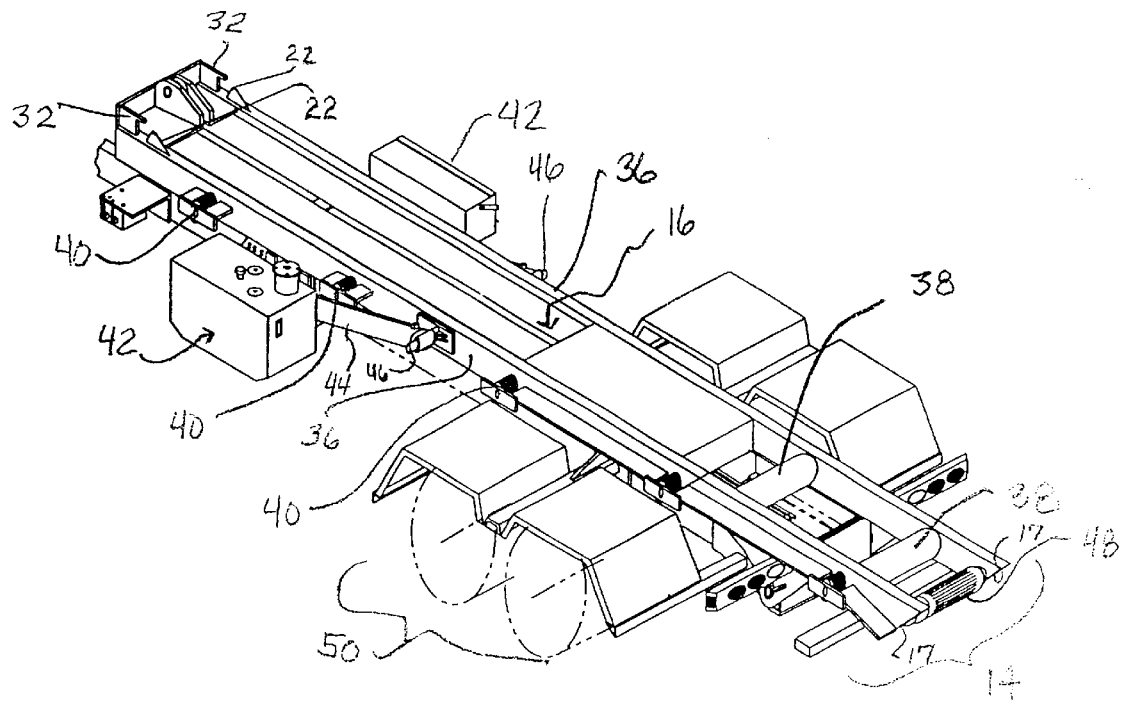
FIG. 15 is a perspective view of the vehicle-mounted roll-off container hoist.

FIGS. 13 and 14 are elevation and plan views, respectively, of the hoist bed 16. FIG. 15 is a perspective view of the hoist bed 16, wherein the frame 18 is shown using broken lines.

The hoist bed 16 preferably includes two longitudinally extending rails 36 of generally rectangular cross section. The rails 36 in the preferred embodiment are hollow. Cross members 38 are provided between the rails 36 to keep the rails 36 spaced apart and parallel to one another.

Preferably, each of the rails 36 is equipped with a locking mechanism 20 according to the present invention. Thus, two locking mechanisms 20 are provided in the illustrated exemplary embodiment, as well as two container stops 32.

Several rollers 40 are provided laterally along the side of the hoist bed 16. The rollers 40 are adapted to engage a set of laterally spaced, longitudinally extending flanges of the container 10 which straddle the hoist bed 16. The rollers 40 facilitate sliding of the container 10 along the hoist bed 16.

In order to provide pivoting of the hoist bed 16 with respect to the frame 18, a hydraulic lift actuator 42 is disposed on each lateral side of the frame 18. Each hydraulic lift actuator 42 has a piston arm 44. Each piston arm 44 has a distal end pivotally connected to a respective laterally extending thrust bracket 46. Each thrust bracket 46 is rigidly secured to a respective one of the rails 36. By hydraulically extending or retracting the piston arms 44 using the hydraulic lift actuator 42, the hoist bed 16 is selectively pivoted away from the frame 18 or toward the frame 18.

Preferably, a back-end roller 48 is provided at the beveled edge 17 of the hoist bed 16. The back-end roller 48 facilitates movement of the beveled edge 17 along the ground when the hoist bed 16 is placed in the inclined hoisting orientation. Rearward movement of the vehicle 12 therefore is facilitated when the hoist 14 initially engages the container 10.

The hoist 14 further includes a cable winch which is used, in a well-known manner, to pull the container 10 along the top surface 15 of the hoist bed 16.

The hoist 14 is particularly well-suited for mounting upon a vehicle such as a semi-trailer or truck. In the illustrated embodiment, the vehicle 12 is a truck with a tandem axle suspension 50 adjacent its rearward end. The truck has a vehicle chassis which carries or is integrally formed with the frame 18.

The present invention also includes a method for hoisting and securing the roll-off container using the vehicle-mounted hoist 14 of the present invention.

Initially, as shown in FIGS. 1–2, the hoist bed 16 is pivoted from a substantially horizontal transport position to an inclined hoisting position. This causes the movable plate 22 to become separated from the frame 18 and allows the movable plate 22 to drop freely under the influence of gravity. In particular, the movable plate 22 drops from its initially upwardly urged position (the movable plate 22 being upwardly urged by the frame so as to project at least partially above the top surface 15 of the hoist bed 16) to a position at or below the top surface 15 of the hoist bed 16.

The container 10 then is hoisted upwardly, as illustrated in FIG. 3, along the top surface 15 of the hoist bed 16 until a predetermined portion of the container 10 reaches the movable plate 22. In the illustrated arrangement, the predetermined portion reaches the movable plate 22 when the guide rollers 21 of the container 10 engage the container stops 32.

As illustrated in FIGS. 4–8, during or after such hoisting, the hoist bed 16 is pivoted from the inclined hoisting position to the substantially horizontal transport position. Such pivoting causes the movable plates 22 to engage the frame 18 and thereby urges the movable plates 22 at least partially above the top surface 15 of the hoist bed 16 to engage and restrain the guide rollers 21 and thereby restrain the roll-off container 10. Preferably, the range of movement of the movable plates 22 is limited when the movable plates 22 drop below the top surface 15 of the hoist bed 16 under the influence of gravity.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

We claim:

1. A locking mechanism for selectively restraining a roll-off container to a hoist bed of a container hoist also having a frame pivotally mounted to the hoist bed, the locking mechanism comprising:
   a guide; and
   a movable plate mounted in the guide, the movable plate being freely movable under the influence of gravity through the guide, between a locking position and an unlocking position so that:
      when the movable plate is in the locking position, the movable plate projects out from the guide so as to restrain the roll-off container; and
      when the movable plate is in the unlocking position, the movable plate is withdrawn into the guide away from the roll-off container to thereby release the roll-off container, the movable plate and guide cooperating so that the movable plate is urged out of the guide and into the locking position by the frame as the container hoist is moved to a transport orientation.

2. The locking mechanism of claim 1, wherein the movable plate is mounted within the guide so that the movable plate automatically moves into the locking position when the container hoist is in the transport orientation and automatically moves into the unlocking position when the container hoist is taken out of the transport orientation toward a hoisting orientation.

3. The locking mechanism of claim 2, wherein the movable plate is pivotally mounted in the guide so as to pivot between the locking and unlocking positions.

4. The locking mechanism of claim 3, wherein the movable plate is arranged so that, whenever the container hoist is taken out of the transport orientation, gravity moves the movable plate into the locking position.

5. The locking mechanism of claim 4, wherein the movable plate includes a bearing surface which is engaged by an actuating surface of the frame when the container hoist is brought into the transport orientation, to urge the movable plate against gravity into the locking position.

6. The locking mechanism of claim 5, wherein the movable plate is shaped so that the bearing surface projects out from the guide when the movable plate is in the unlocking position, to facilitate engagement of the bearing surface by the actuating surface.

7. The locking mechanism of claim 2, wherein the movable plate is arranged so that, whenever the container hoist is taken out of the transport orientation, gravity moves the movable plate into the unlocking position.

8. The locking mechanism of claim 7, wherein the movable plate includes a bearing surface which is engaged by an actuating surface of the frame when the container hoist is brought into the transport orientation, to urge the movable plate against gravity into the locking position.

9. The locking mechanism of claim 8, wherein the movable plate is shaped so that the bearing surface projects out from the guide when the movable plate is in the unlocking position, to facilitate engagement of the bearing surface by the actuating surface.

10. The locking mechanism of claim 1, wherein the movable plate is arranged so that, whenever the container hoist is taken out of a transport orientation, gravity moves the movable plate into the unlocking position.

11. The locking mechanism of claim 10, wherein the movable plate includes a bearing surface which is engaged by an actuating surface of the frame when the container hoist is brought into the transport orientation, to urge the movable plate against gravity into the locking position.

12. The locking mechanism of claim 11, wherein the movable plate is shaped so that the bearing surface projects out from the guide when the movable plate is in the unlocking position, to facilitate engagement of the bearing surface by the actuating surface.

13. The locking mechanism of claim 1, wherein the movable plate is pivotally mounted to the guide so as to pivot between the locking and unlocking positions.

14. The locking mechanism of claim 1, further comprising a stop member operably associated with the movable plate to limit movement of the movable plate.

15. A hoist bed for pivotal mounting to a frame of a container hoist and for selectively restraining a roll-off container, comprising:

an elongate bed having a slot formed therein, thereby defining a guide;

a container stop extending from said bed, the container stop precluding movement of the container in a first direction beyond a predetermined position on the bed;

a movable plate mounted in the guide, the movable plate being freely movable under the influence of gravity through the guide, between a locking position and an unlocking position so that:

when the movable plate is in the locking position, the movable plate projects out from the guide so as to restrain the roll-off container; and when the movable plate is in the unlocking position, the movable plate is withdrawn into the guide away from the roll-off container to thereby release the roll-off container, the movable plate and guide cooperating so that the movable plate is urged out of the guide and into the locking position by the frame as the container hoist is moved to a transport orientation, wherein the movable plate is positioned so as to cooperate with the container stop, the movable plate being arranged so that when the movable plate is in the locking position, the movable plate precludes movement of the container in a direction opposite that of the first direction.

16. A container hoist for loading, unloading and transporting a roll-off container, the container hoist comprising:

a frame;

a hoist bed pivotally mounted to the frame; and at least one locking mechanism for selectively restraining a roll-off container to the hoist bed, said at least one locking mechanism including a guide formed in the hoist bed and a movable plate mounted in the guide, the movable plate of said at least one locking mechanism being freely movable under the influence of gravity through the guide, between a locking position and an unlocking position, so that:

when the movable plate is in the locking position, the movable plate projects out from the guide so as to restrain the roll-off container; and when the movable plate is in the unlocking position, the movable plate is withdrawn into the guide away from the roll-off container to thereby release the roll-off container, the movable plate and guide cooperating so that the movable plate is urged out of the guide and into the locking position by the frame when the container hoist is moved to a transport orientation.

17. The container hoist of claim 16, wherein the movable plate in said at least one locking mechanism is mounted within the guide so that the movable plate automatically moves into the locking position when the container hoist is in the transport orientation and automatically moves into the unlocking position when the container hoist is taken out of the transport orientation toward a hoisting orientation.

18. The container hoist of claim 16, wherein the movable plate is pivotally mounted in the guide so as to pivot between the locking and unlocking positions.

19. The container hoist of claim 16, wherein the movable plate is arranged so that whenever the container hoist is taken out of a transport orientation, gravity moves the movable plate into the unlocking position.

20. The container hoist of claim 19, wherein the movable plate includes a bearing surface which is engaged by an actuating surface of the frame when the hoist is brought into the transport orientation, to urge the movable plate against gravity into the locking position.

\* \* \* \* \*